United States Patent [19]

Tsuji

[11] 3,939,251

[45] Feb. 17, 1976

[54] REGENERATION METHOD FOR GAS TREATING APPARATUS

[75] Inventor: Sabro Tsuji, Tokyo, Japan

[73] Assignee: Hitachi, Ltd., Japan

[22] Filed: Aug. 7, 1972

[21] Appl. No.: 278,371

Related U.S. Application Data

[63] Continuation-in-part of Ser. No. 872,286, Oct. 29, 1969, abandoned.

[30] Foreign Application Priority Data

Nov. 1, 1968 Japan................................ 43-79308

[52] U.S. Cl................................ 423/244; 423/522
[51] Int. Cl.²...................... C01B 17/00; B01J 8/00
[58] Field of Search........................... 423/242–244, 423/522

[56] References Cited
FOREIGN PATENTS OR APPLICATIONS

| | | | |
|---|---|---|---|
| 1,052,188 | 12/1966 | United Kingdom.................. | 423/522 |
| 1,098,557 | 1/1968 | United Kingdom.................. | 423/244 |
| 1,209,002 | 10/1970 | United Kingdom.................. | 423/522 |

Primary Examiner—Oscar R. Vertiz
Assistant Examiner—Gregory A. Heller
Attorney, Agent, or Firm—Craig & Antonelli

[57] ABSTRACT

A method of desulphurization of a flue gas comprising passing a flue gas to a plurality of adsorption beds each having an activated carbon layer packed therein thereby separating a sulphur oxide contained in the flue gas by adsorption of the sulphur oxide in the activated carbon; continuing the adsorption until the concentration of sulphur oxide acid in the activated carbon reaches a predetermined value; providing a liquid for regenerating the activated carbon with at least one of the adsorption beds in order to wash down the activated carbon layer, wherein the introduction of the liquid into the adsorption bed to be regenerated is carried out while keeping all the passageways for introducing the flue gas into the adsorption beds open, thereby reducing a flow amount of flue gas in the adsorption bed to be regenerated so as to suppress adsorption of the sulphur oxide therein and to regenerate the adsorption bed. The supply of the regenerating liquid to each of the adsorption beds is repeatedly carried out in accordance with a predetermined time schedule.

18 Claims, 6 Drawing Figures

3,939,251

REGENERATION METHOD FOR GAS TREATING APPARATUS

This application is a continuation-in-part of Ser. No. 872,286, filed Oct. 29, 1969, and now abandoned.

BACKGROUND OF THE INVENTION

The present invention relates to a method of desulphurization of a flue gas exhausted from boilers, industrial furnaces and the like and more particularly to a method of desulphurization of a flue gas which enables the operation of a desulphurizing apparatus or plant to be simplified. The present invention also relates to an improved desulphurizing apparatus having a simplified construction and a lowered production cost.

With the development of industry, the quantity of harmful gases, especially, sulphurous acid ($SO_2$) and sulphuric acid anhydride ($SO_3$) contained in the flue gas from a furnace in which sulphur-containing coal or heavy oil is burnt or in the flue gas from a sulphuric acid production plant, exhausted into the atmosphere along with the flue gas from various industrial facilities, is increasing and hence the air pollution in the vicinity of the facilities is increasing. As a result, the harmful effect of such gases on the inhabitants in the area of the facility is becoming a great social problem in recent years, and development of various types of flue gas treating apparatus is urgently desired.

As one such exhaust gas treating apparatus, an apparatus has been developed in which the sulphur oxides ($SO_2$ and $SO_3$) are separated and removed by passing the exhaust gas through an adsorption bed packed with activated carbon. The general techniques used in apparatus are known from U.S. Pat. No. 2,992,065, U.S. Pat. No. 2,992,895 and the technical treatise of Mr. F. Johswich, published on page 18 of Combustion, Oct. 1965, under the title of "The Present Status of Flue Gas Desulphurization".

A flue gas treating apparatus of adsorption bed type generally comprises a plurality of adsorption beds each being packed with activated carbon. After the activated carbon has become inactive to adsorb the sulphur oxide, the adsorption beds must be regenerated or recovered by a suitable manner such as washing down the activated carbon.

In the conventional regeneration methods a regenerating liquid such as water or a dilute sulphuric acid solution is supplied to an adsorption bed to be regenerated after the flue gas inlets thereof are closed. After the regeneration or washing down of the activated carbon has finished, the flue gas inlets are opened again.

Since the operation of the flue gas inlets has inevitably to be performed in a cycle at a certain time interval and in an actual apparatus the valve of the flue gas to be treated is extremely large, the switching operation of the valve means provided in the flue gas inlets requires considerable labor or elaborate control devices.

SUMMARY OF THE INVENTION

It is an object of the present invention to provide a method of desulphurization of a flue gas containing sulphur oxide wherein operation of the method is simplified and a simplified apparatus is employed.

It is another object of the present invention to provide a method of desulphurization of a flue gas which enables the construction of a simplified desulphurizing apparatus and saves production costs.

It is still another object of the present invention to provide a method of desulphurization of a flue gas which has an increased desulphurization rate.

It is a still further object of the present invention to provide apparatus for desulphurization of a flue gas which has a simplified construction and an improved operability and a low cost. The desulphurization apparatus according to the present invention has an improved maintenance due to its simplified construction.

The present invention is based upon the fact that a flow of flue gas in an adsorption bed is effectively regulated by providing a proper amount of a liquid for regenerating activated carbon, whereby, closing and opening of flue gas inlets can be accomplished without operation of a valve means in passageways connected to the inlets.

BRIEF DESCRIPTION OF THE DRAWINGS

The above objects and other objects and features of the present invention will be apparent from the following detailed description taken in conjunction with the accompanying drawings, wherein.

DETAILED DESCRIPTION OF THE PREFERRED EMBODIMENTS

As heretofore stated, the present invention provides a method of regulating the flue gas flow in an adsorption bed to be regenerated such that the flue gas flow is intercepted or suppressed by supplying a regenerating liquid such as water or dilute sulphuric acid solution to the adsorption bed. According to this regulation method, the operation of the desulphurizing apparatus will be remarkably simplified since there is no need to operate valve means provided in flue gas inlets for opening and closing the passageways communicated with the inlets. Further, it is a significant advantage of the apparatus according to the present invention that valve means for flue gas inlets, which are made of expensive sulphur oxide-resisting materials would be completely omitted thereby lowering the production cost of the apparatus because the switching operation of the supplying of the flue gas to each adsorption bed can be performed by controlling the amount of regenerating liquid.

Figure 1:
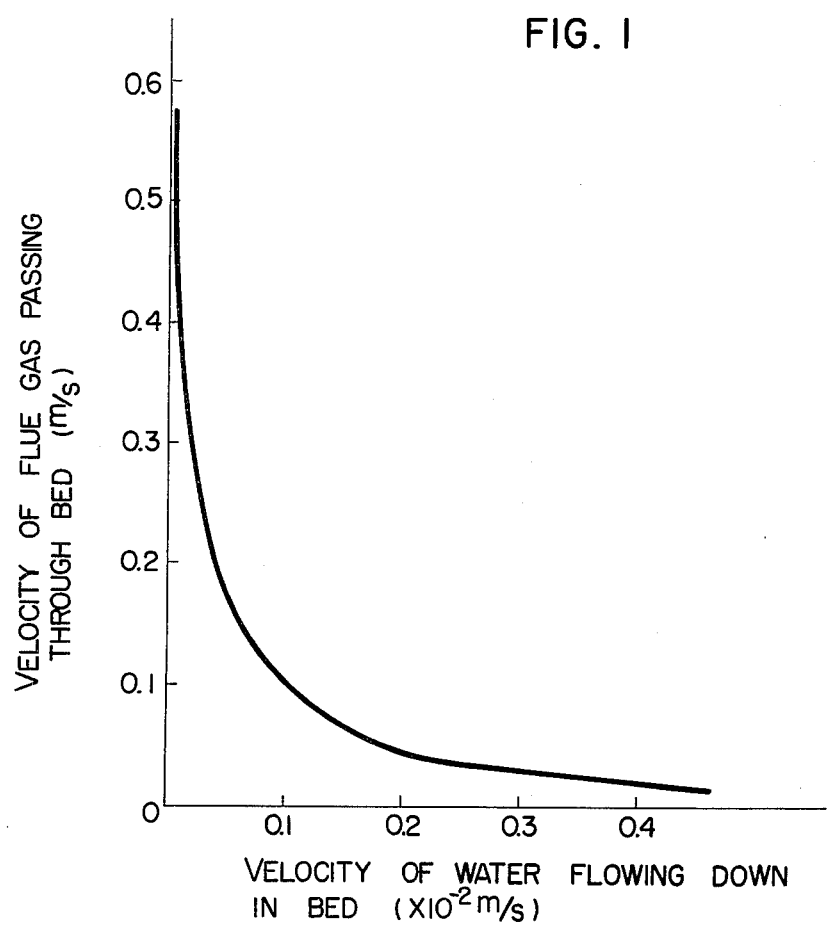
FIG. 1 is a graph showing the relationship between the velocity of the flue gas passing through an adsorption bed and the velocity of the regenerating liquid flowing down through the adsorption bed.

Referring to FIG. 1, which explains the relationships between velocities of water and flue gas in an adsorption bed, the abscissa is the velocity of water flowing down in an adsorption bed, and the coordinate is the velocity of the flue gas passing upwardly through the bed. In this experiment, the thickness of activated carbon layer in the adsorption bed was 2000 mm and the activated carbon was in the form of pellets of 5 to 8 mm in diameter.

As apparent from FIG. 1, when the supply of water has begun, the flow rate of the flue gas passing through the adsorption bed decreases sharply, even with a slight increase in the flow rate of water. When the flow rate of water is $0.1 \times 10^{-2}$ m/s for instance, the flow rate of the flue gas is 0.1 m/s which is about one fifth of that when water is not supplied, and when the flow rate of water is $0.2 \times 10^{-2}$ m/s or higher, the flow rate of the flue gas is only one tenth or less of that when water is not supplied. The flow rate of the flue gas is effectively controlled in accordance with the flow rate of the regenerating liquid.

Since the flue gas untreated should be subjected to desulphurization without interruption, the plural adsorption beds are arranged in parallel with respect to the flow of the flue gas, wherein some of the adsorption beds or a single adsorption bed is always subjected to regeneration while the predominant number of adsorption beds are in an adsorption step.

As apparent from FIG. 1, the regulation of the flue gas flow can effectively be done by providing at least $0.2 \times 10^{-2}$ m/s of a regenerating liquid. With an increase in an amount of regenerating liquid, the velocity of the flue gas can be made very small. In case of $0.4 \times 10^{-2}$ m/s of the velocity of the regenerating liquid, the velocity of the flue gas is only about 0.02 m/s which is about one thirtieth (1/30) of that when the regenerating liquid is not supplied. Therefore, considering the small amount of the flow of the flue gas passing through an adsorption bed in the regeneration step, it can be said that substantially all of the flue gas to be treated is evenly distributed among the remainder of the adsorption beds.

Figure 2:
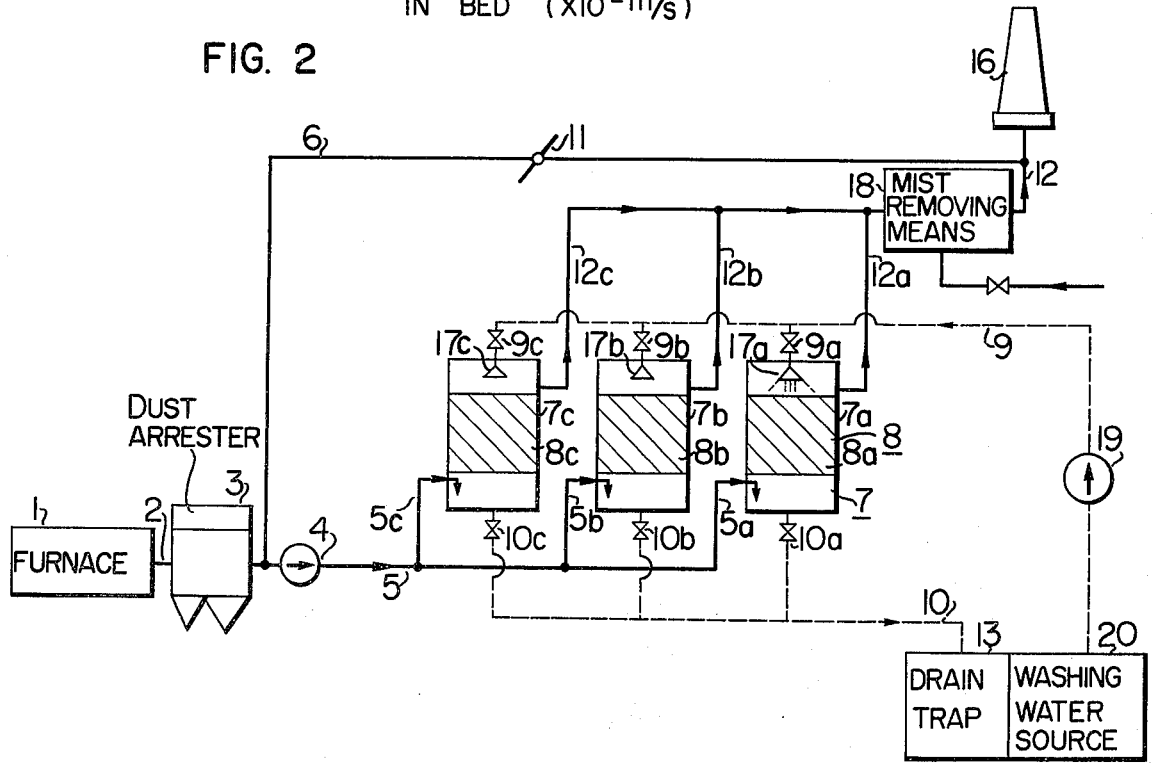
FIG. 2 is a diagram of a desulphurizing apparatus according to the present invention.

Referring to FIG. 2 illustrating an example of a desulphurizing apparatus according to the present invention, a flue gas containing sulphur oxide ($SO_2$ and $SO_3$) from a furnace 1 is led through a duct 2 and a dust arrestor 3 for removing dust therefrom to a blower 4 thereby pressurizing the flue gas. The pressurized flue gas is provided to adsorption beds 7a, 7b, 7c through gas passageways 5a, 5b, 5c, respectively. Since water is being fed to the adsorption bed 7a by a distributor 17a, the flow of the flue gas in the bed 7a is intercepted or extremely reduced. Therefore, substantially all the pressurized flue gas is distributed between the beds 7b, 7c.

Each adsorption bed is provided with an activated carbon layer 8a, 8b, 8c which is formed on a support such as a grid or lattice (not shown). With reference to one adsorption bed, the activated carbon layer therein is alternatively subjected to adsorption and regeneration in a cycle in a predetermined order and a predetermined time schedule.

After the activated carbon layer has been washed down sufficiently to be regenerated, a valve for feeding the regenerating liquid is closed and, subsequently, the drying of the wetted activated carbon starts. Since the drying of the activated carbon, which takes place by vaporization of the regenerating liquid, is easily completed or an amount of the liquid held up by the activated carbon is sufficiently reduced to adsorb the sulphur oxide, in a short period of time, the adsorption of sulphur oxide takes place in all adsorption beds other than that undergoing the regeneration step.

The regenerating liquid used is discharged into a drain trap 13 through a drain valve 10a and a drain conduit 10. When ends of the inlets 5a, 5b, 5c are opened opposite to the direction of the flow of a regenerating liquid as shown in FIG. 2, flowing of the regenerating liquid into the inlets is avoided since the inlets and conduit 5 are always pressurized. This means that the apparatus is more simplified in its construction than the conventional apparatus which are provided with valve means for switching the flue gas flow. If the switching is performed by valve means it is not avoidable that a considerable amount of the regenerating liquid enters into the inlets. Therefore, in the conventional apparatus it is necessary to provide a suitable water seal means for the inlets.

The flue gas streams leaving the respective adsorption beds are gathered and the flue gas having been desulphurized is exhausted through a mist removing means 18 and a conduit 12 from a chimney 16 at a desired temperature such as 100°C. and sufficiently dispersed into the atmosphere. A part of the flue gas is by-passed by a conduit 6 and it is mixed into the treated gas in a conduit 12 through a valve 11 so as to adjust the final temperature of the flue gas exhausted from chimney 16.

A regenerating liquid is supplied into each adsorption bed by a distributor 17a through valves 9a, 9b, 9c and a conduit 9. The liquid is pressurized by a pump 19. In case of desulphurization of a flue gas a dilute sulphuric acid solution produced in the desulphurizing apparatus is more preferable than water. In FIG. 2, drain trap 13 and washing water source 20 are interconnected so that the drainage drawn from the bottoms of the beds through valves 10a, 10b, and 10c is gathered and recycled as a regenerating liquid and additional water is added to the recycle at desired intervals. In view of recycling of the resulting dilute sulphuric acid, the total amount of water used and the capacities of the flow control devices such as pump 19 and other parts of apparatus can be made small. In this method, a suitable facility known per se for recycling the drainage liquid may be used when necessary. It will be understood that recycling is not always necessary.

For the sake of better understanding of the present invention, the following examples are presented.

EXAMPLE 1

In this example experimental data resulting from the operating of the desulphurizing apparatus shown in FIG. 2 are tabulated below:

A. Conditions of Operation

1. Composition of a flue gas: $CO_2$ 12%, $H_2O$ 10%, $O_2$ 5%, $SO_2$ 1500 ppm, $N_2$ remainder, the percentages are all percent by volume.
2. Temperature of the flue gas at an inlet: 130°C.
3. Flow rate of flue gas: 10,000 m³/h. (i.e. 3380 Nm³/h per one bed.
4. Activated carbon: pellets of 5 to 8 mm in diameter.
5. Height of activated carbon layer: 2,000 mm which includes 10 cm of a thickness of a lattice and coaks layer supporting the layer.
6. Amount of activated carbon: 5 m³/one bed
7. Column volume: 1.8 m. in diameter × 4 m. in height.

8. Regenerating liquid: Water (20°C.)
9. Amount of water supplied to one bed: enough to reduce the flow rate of flue gas to one tenth or less of that of adsorption beds in adsorption step.

B. Results Obtained

1. Content of sulphur oxide at an outlet of beds 8b and 8c: less than 150 ppm (i.e. 90% of desulphurization rate).
2. Content of sulphur oxide at an outlet of a bed in a drying step for about 5–20 minutes just after the supplying of water has been stopped: less than 300 ppm.
3. Content of sulphur oxide in the flue gas to be exhausted from the chimney: less than 150 ppm.
4. Content of $H_2O$ in the flue gas at the position in front of the chimney: 12%.
5. Pressure drop of the flue gas in each bed in adsorption step: 300 mm Aq.
6. Temperature of flue gas at an outlet of each bed: 135°C.

Although the temperature of flue gas from the furnace is 130°C., the temperature of flue gas at the outlet of each bed is increased to 135°C. because the adsorption heat is generated in the bed.

7. Temperature of flue gas at the position in front of the chimney: 95°C.

Figure 5:
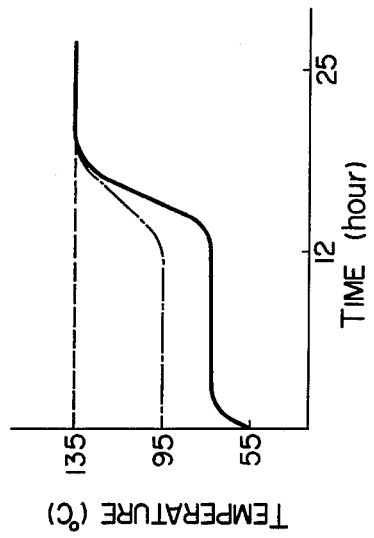
FIG. 5 is a graph showing the relationship between temperatures of flue gases and time with respect to the desulphurizing apparatus shown in FIG. 2.

Since in the apparatus of FIG. 2 there are three beds one of which is always subjected to regeneration and therefore the temperature of flue gas from the bed in drying step is 55°C. (the saturated temperature), the average temperature of flue gas in the conduit 12 is 95°C., as apparent from FIG. 5.

EXAMPLE 2

Figure 3:
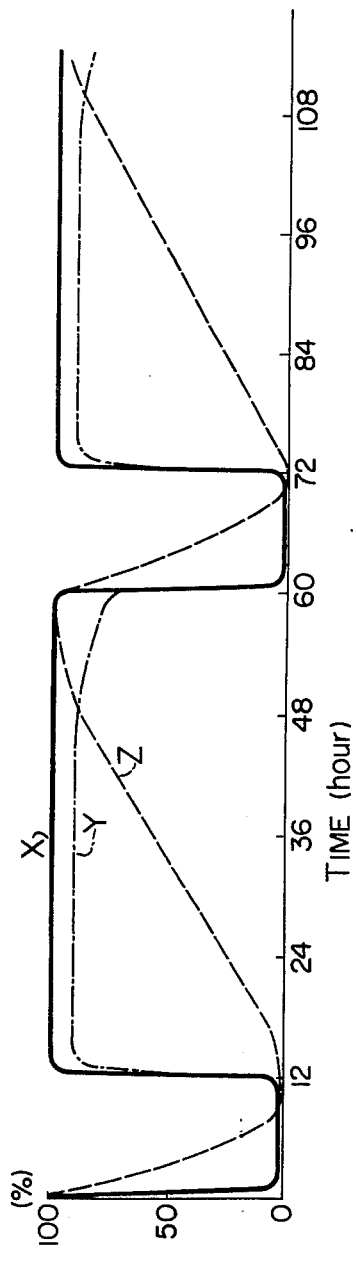
FIG. 3 is a graph showing the relationship between the flue gas flow rate, the adsorbing quantity of sulphur oxide and sulphuric acid content in the activated carbon layer, and the time with respect to a single adsorption bed in a desulphurizing apparatus of the present invention.
Figure 4:
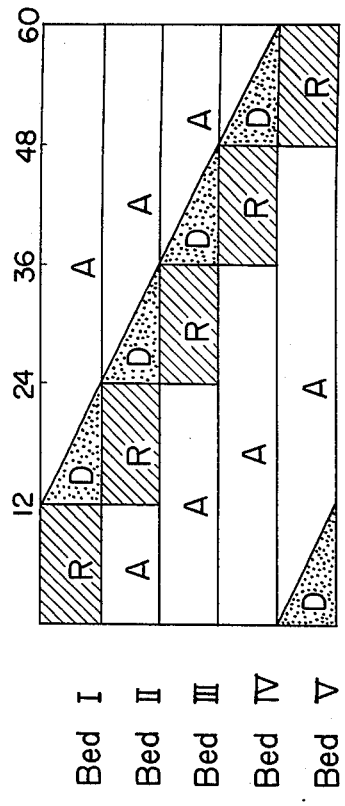
FIG. 4 is a table of a time schedule for operating a desulphurizing apparatus of another embodiment.

FIGS. 3 and 4 illustrate the operation and features of another embodiment of the desulphurizing apparatus according to the present invention, wherein the arrangement of apparatus shown in FIG. 2 is modified by increasing the number of carbon-containing beds and the conditions set forth in Example 1 are employed. In this example, five (5) beds are employed in order to carry out more smoothly the switching operation of flue gas and to avoid an excess decreasing of the temperature of flue gas at the chimney. That is, the above requirements are satisfied by decreasing the volume of flue gas cut off by regeneration from the flue gas passageway.

In the operation of this apparatus, as shown in FIG. 4, the regeneration cycle (R) is continued for 12 hours and the drying (D) of a wetted activated carbon layer is accomplished within 12 hours. The adsorption cycle (A) is carried out for 36 hours. But, as can be seen from FIG. 4, the adsorption of sulphur oxide takes place even in the drying step or cycle, since each drying step is accomplished within 12 hours and an amount of activated carbon dried or effective to adsorb the sulphur oxide increases with time. Actually, it is practically impossible to clearly show the critical point between the drying step and adsorption step. Thus it will be recognized that these steps are parts of a continuous process unlike the regeneration step.

In any event, the regeneration, drying and adsorption steps in one bed are repeated in accordance with a predetermined time schedule, and it is practical to carry out the operation in such a manner that the regeneration step of each adsorption bed does not superpose that of other adsorption beds.

Referring to FIG. 3, curve x represents a change of an amount of flue gas flowing through an adsorption bed, curve y a change of an adsorbing quantity of sulphur oxide in the flue gas exhausted from the adsorption bed, and curve z a change of a sulphuric acid concentration in the activated layer of the adsorption bed. Note that the percentage of curve z is a percentage of an actual sulphuric acid concentration with respect to a predetermined concentration at which the activated carbon should be regenerated. Sulphuric acid is formed in the actual carbon layer by the reaction between $SO_2$ or $SO_3$ and $O_2$ contained in the flue gas and $H_2O$ as follows:

$$SO_2 + 1/2 O_2 \rightarrow SO_3$$
$$SO_3 + H_2O \rightarrow H_2SO_4$$

From FIG. 3, which shows the changes of three components in one of adsorption beds whose operation is disclosed above, taken in conjunction with FIG. 4, the flow rate of the flue gas is sharply lowered as an increase in an amount of a regenerating liquid. Also, at the same time, the content of sulphuric acid is rapidly reduced as shown by curve z. During this regeneration step, the desulphurization is negligibly small; but as soon as the supplying of liquid is stopped, the flue gas passes through upwardly the adsorption bed so that the drying of the activated carbon takes place.

After a valve provided in an inlet of the regenerating liquid supply conduit has been closed; the amount of flue gas flowing out the adsorption bed rapidly increases and it reaches 100% in a short time. This occurs even when the activated carbon has not been dried completely, as shown by curve x. On the other hand, a desulphurization rate is very small during the regeneration step and at the beginning of the drying step as shown by curve y. But, since the adsorption bed can be rapidly recovered to adsorb as soon as the flue gas is fed to the bed, the desulphurization rate reaches 90% or more in a short time.

EXAMPLE 3

Figure 6:
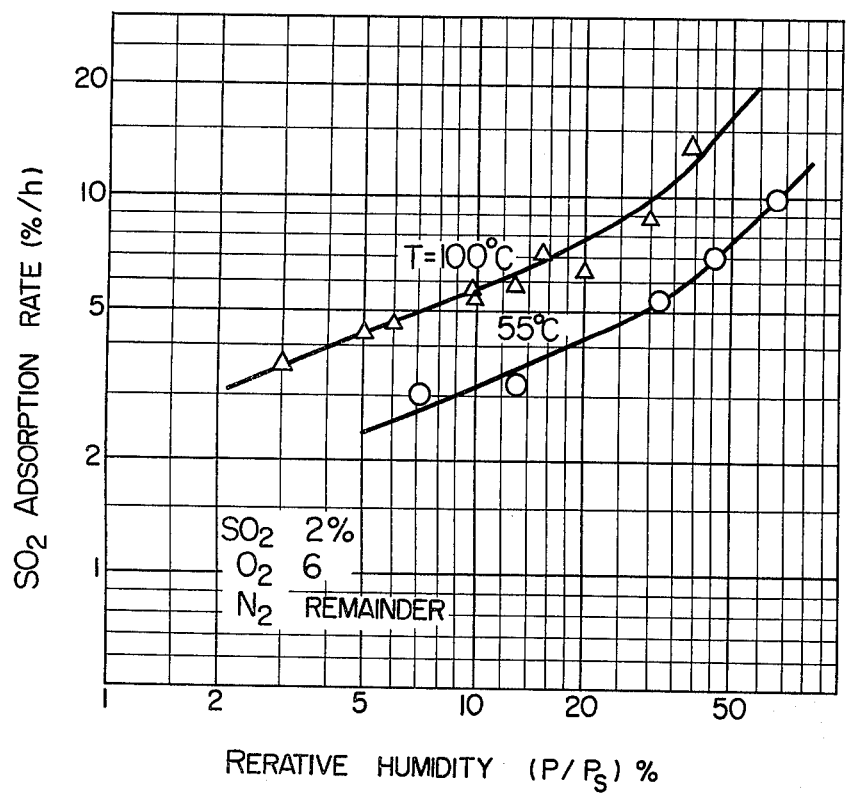
FIG. 6 is a logarithmic graph showing the relationship between the adsorption rate of sulphurous acid and the relative humidity of the system.

Referring to FIG. 6 which shows the effect of water contained in a flue gas on the adsorption rate in an apparatus of the type shown in FIG. 2, T is a temperature of activated carbon or adsorption temperature, P an amount of water, PS a saturated humidity. A flue gas used in this experiment comprises 2% by volume of $SO_2$; 6% of $O_2$ and $N_2$ remainder. According to FIG. 6, it will be understood that the higher the humidity in the flue gas, the higher the adsorption rate becomes. The inventor does not fully understand why the presence of water increases the adsorption.

It was found that the proper temperature of flue gas fed to adsorption beds ranges between about 55° and 150°C., more particularly, between about 70° and 130°C. If the temperature is higher than about 150°C., the activated carbon might be deteriorated because the temperature is increased by adsorption-heat; while the activated carbon itself can withstand a temperature of 150°C. On the other hand, it is not practical to use a flue gas of a temperature lower than 55°C., because the adsorption efficiency is not high at such low temperatures as can be seen from FIG. 6.

What is claimed is:
1. A method of desulphurizing an exhaust gas containing sulphur oxide comprising:
   1. introducing an exhaust gas containing sulphur oxide into a plurality of adsorption beds via open passageways, each bed being arranged in parallel with respect to the flow of exhaust gas and being packed with activated carbon thereby separating said sulphur oxide from said exhaust gas;

2. supplying a regenerating liquid from the top of the activated carbon layer to at least one of the adsorption beds when the a concentration of sulphur oxide adsorbed in said activated carbon has reached a predetermined value in order to regenerate said activated carbon;

3. drying said activated carbon wetted by said regenerating liquid with said exhaust gas whereby the activity of said activated carbon is increased to adsorb said sulphur oxide; said introducing of said flue gas, supplying of said regenerating liquid and drying of said activated carbon being carried out and repeated in accordance with a predetermined time schedule, the passageways for introducing said flue gas into each of said adsorption beds being kept open during said time schedule, and 4. regulating the flow rate of said flue gas in an adsorption bed to be regenerated solely with an increase in the flow rate of said regenerating liquid supplied to said adsorption bed, whereby said activated carbon in said adsorption bed to be regenerated is washed down.

2. The method of claim 1, wherein the exhaust gas is a hot flue gas.

3. A method of desulphurizing a flue gas comprising the following steps which are each repeated in accordance with a predetermined time schedule:

a. continuously introducing a pressurized flue gas containing a sulphur oxide into each of a plurality of adsorption beds, each bed being arranged in parallel with respect to a flow of said flue gas and being packed with a layer of activated carbon, the pressure of said flue gas always being exerted on the activated carbon layer;

b. supplying a predetermined flow of a regenerating liquid on the top surface of said activated carbon layer in an adsorption bed to be regenerated in such a manner that substantially the whole area of said top surface of said activated carbon layer is sufficiently wetted by said regenerating liquid, whereby sulphuric acid formed from the sulphur oxide and water and adsorbed in said activated carbon is washed down to regenerate said activated carbon; and c. stopping the supply of said regenerating liquid after a predetermined period of time, whereby the flowing of said flue gas through said adsorption bed is allowed and drying of said activated carbon starts, the step of supplying of said regenerating liquid being carried out in such a manner that each of said supplying steps with respect to each of said adsorption beds does not superpose within said time schedule, the flow of gas through each of said adsorption beds being solely controlled by the supplying of regenerating liquid thereto.

4. The method of claim 3, wherein the flue gas introduced into said adsorption beds has a temperature of at least about 55°C.

5. A method of desulphurizing a flue gas comprising:

a. introducing a flue gas containing a sulphur oxide and oxygen at a temperature of from about 55° to about 150°C through a passageway communicated with a flue source into a desulphuring apparatus wherein a plurality of adsorption beds, each being provided with an activated carbon layer, are arranged in parallel with respect to said passageway and a duct communicated with a chimney for exhausting the flue gas treated in said apparatus, each of said adsorption beds being in constant communication with said passageway and said duct;

b. starting to supply a regenerating liquid at a predetermined flow rate to one of said adsorption beds after the quantity of sulphur oxide adsorbed in said activated carbon layer in said adsorption bed has reached a predetermined value;

c. continuing to supply said regenerating liquid until the sulphuric acid formed from the adsorbed sulphur oxide is washed down sufficiently to regenerate said activated carbon layer;

d. stopping the supply of said regenerating liquid into said one bed after said adsorption bed has been regenerated, whereby the flowing of said flue gas through said one adsorption bed automatically begins again so that the wetted activated carbon layer is dried and recovered to adsorb said sulphur oxide; and e. effecting the above steps of starting, continuing and stopping of said regenerating liquid into another adsorption bed so that the flow of flue gas through each bed is solely controlled by supply of regenerating liquid thereto.

6. The method of desulphurizing a flue gas of claim 5 wherein the velocity of said regenerating liquid fed to said adsorption bed is kept at at least $0.2 \times 10^{-2}$ m/s during regeneration of said bed.

7. A method for desulphurizing a hot flue gas containing sulphur oxide which comprises introducing the hot flue gas upwardly through a plurality of adsorption beds being arranged in parallel and containing activated carbon to remove the sulphur oxide; supplying a regenerating liquid selected from the group consisting of water and dilute sulfuric acid to the top of one of the adsorption beds when the concentration of adsorbed sulphur oxide has reached a predetermined level to remove the adsorbed sulphur oxide as the liquid passes downwardly through the bed; drying the wet activated carbon by passing the hot flue gas upwardly through the regenerated adsorption bed; controlling the rate of supply of said regenerating liquid to resist the passage of the flue gas upwardly through the bed during the regeneration step; when said bed is subsequently changed over from regeneration step to said drying step, stopping the supply of said regenerating liquid to remove the resistance of said liquid against the passage of said flue gas; and changing from the drying step to the adsorption step immediately after drying of the activated carbon is completed, the passage of the flue gas, concurrently supplied to each of said beds, through the one adsorption bed undergoing regeneration thereby being solely controlled by the supply of the regenerating liquid to said one bed.

8. A process for desulphurizing flue gas comprising passing pressurized flue gas into a passageway in constant communication with at least three adsorbent beds arranged in parallel with respect to the flow of the gas, said adsorbent beds each packed with an adsorbent for the sulphur oxides located above the point in said adsorbent beds where said passageway is in communication with said adsorbent beds, each adsorbent bed above said adsorbent being in constant communication with a common outlet passage for removing desulphurized flue gas from said adsorbent beds, and supplying a liquid capable of regenerating said adsorbent to one of said adsorbent beds above the adsorbent therein so that said liquid regenerates said adsorbent and automatically reduces the flow of flue gas through said one adsorbent bed, whereby flow of flue gas through each adsorbent bed is solely controlled by the supply of liquid thereto.

9. A process according to claim 8 further comprising continuing the supply of liquid to said one adsorbent bed until said one adsorbent bed is substantially regenerated, stopping the supply of liquid to said one adsorbent bed and supplying a second of said adsorbent beds with said liquid above the adsorbent in said adsorbent beds whereby the flow of flue gas in said second adsorbent bed is automatically reduced by the liquid in said second bed and the flow of gas through said one adsorbent bed is automatically resumed as the liquid in said one adsorbent bed evaporates.

10. The process according to claim 9, wherein each of said adsorbent beds is periodically regenerated by supplying said liquid to said adsorbent bed above the adsorbent bed and wherein the flow of flue gas through the adsorbent bed being regenerated is automatically reduced by the liquid in said adsorbent bed and automatically resumes after the supply of liquid to the bed is stopped and the liquid in the bed is evaporated, only one of said adsorbent beds being supplied with liquid at any one time.

11. The process according to claim 10, wherein the flue gas is passed through three different adsorbent beds.

12. The process according to claim 9, comprising recovering the regenerating liquid passing out of the adsorbent bed being regenerated and utilizing the recovered regenerating liquid to supply the adsorbent bed being regenerated.

13. The process according to claim 9, wherein said adsorbent is activated carbon and said regenerating liquid is water or a dilute aqueous solution of sulphuric acid.

14. The process according to claim 9, wherein said flue gas is passed into five different adsorbent beds, only one of said adsorbent beds being supplied with regenerating liquid at any one time.

15. The process according to claim 9, wherein the temperature of the flue gas fed to the adsorption beds is maintained between about 55° and 150°C.

16. The process according to claim 8, comprising recovering the regenerating liquid passing out of the adsorbent bed being regenerated and utilizing the recovered regenerating liquid to supply the adsorbent bed being regenerated.

17. The process according to claim 9, wherein said adsorbent is activated carbon and said regenerating liquid is water or a dilute aqueous solution of sulphuric acid.

18. The process according to claim 8, wherein said flue gas is passed into five different adsorbent beds, only one of said adsorbent beds being supplied with regenerating liquid at any one time.

* * * * *